Jan. 12, 1960         J. L. DWYER         2,920,655
HIGH TEMPERATURE AND HIGH PRESSURE DIAPHRAGM
Filed July 31, 1956
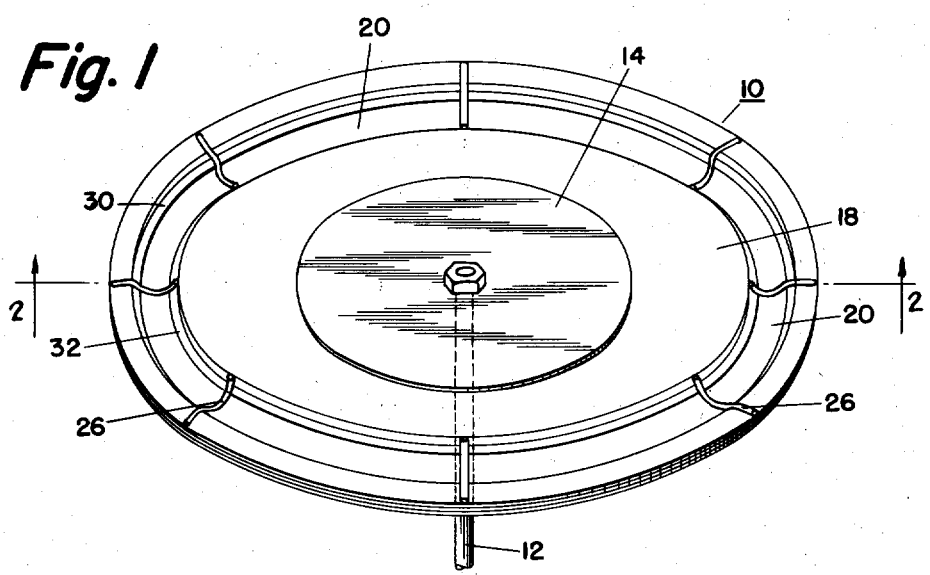
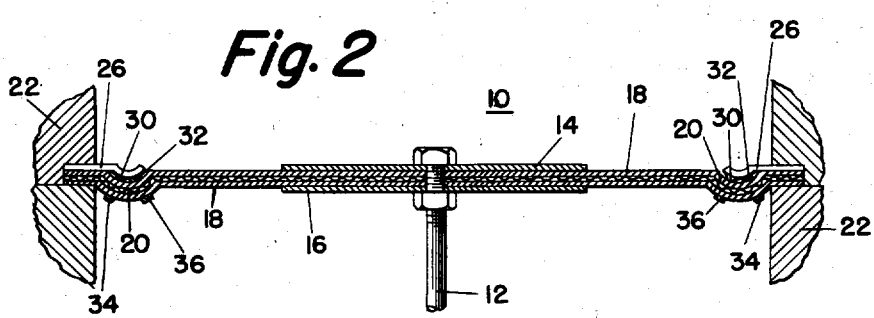
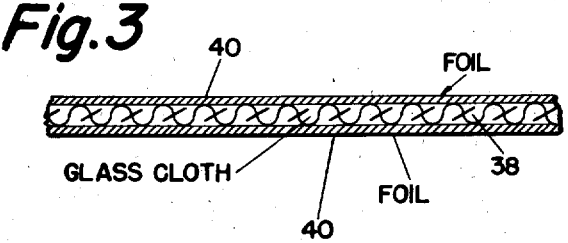
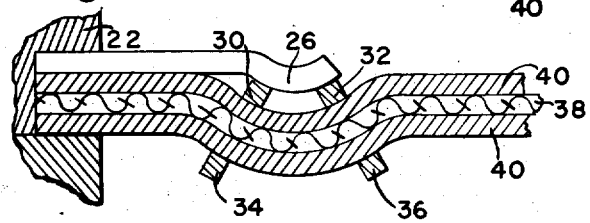
INVENTOR.
JAMES L. DWYER
BY Robert O. Spindle
ATTORNEY

United States Patent Office 2,920,655
Patented Jan. 12, 1960

2,920,655

HIGH TEMPERATURE AND HIGH PRESSURE DIAPHRAGM

James L. Dwyer, Green Bay, Wis., assignor to Sun Oil Company, Philadelphia, Pa., a corporation of New Jersey Application July 31, 1956, Serial No. 601,257

4 Claims. (Cl. 137—793)

This invention relates generally to diaphragms and specifically to diaphragms for use in devices such as pressure indicators and diaphragm operated valves which are subjected to above normal operating temperatures and pressures.

At the present time, diaphragms for these devices are made of a rubber base in which some reinforcing may be placed at the point of maximum flexure. An example of such a composite element would be rubber in which a fabric of cotton duck is adhesively bound. This form of diaphragm, although acceptable for limited use, will not give satisfactory service under conditions of high temperatures and pressures. When used in these circumstances the rubber cracks and, under repeated flexing, the fabric reinforcing is worn through.

Further, diaphragms of the reinforced rubber type, in order to withstand the demands of high temperature and pressure devices, must be strongly made. This enables the diaphragm to retain any impressed shape but reduces the sensitivity of the device.

It is an object of this invention to provide a diaphragm especially constructed for use under conditions of high temperature and pressure.

It is another object of this invention to provide a diaphragm of great sensitivity and long life under conditions of high temperature and pressure.

These and other objects will be evident as the description progresses with reference to the drawings, in which—

Figure 1 is a perspective view looking down on the diaphragm.

Figure 2 is a sectional view of Figure 1 taken on lines 2—2.

Figure 3 is an enlarged section of the diaphragm to show the layer structure.

Figure 4 is a fragment of Figure 2, drawn on an enlarged scale.

The problem of diaphragm structure to meet conditions of sensitive flexure response for long periods of time under conditions of high temperature and pressure requires consideration of strength, flexibility, and resistance to high temperatures. When a fluid is the activating means, a satisfactory diaphragm must additionally be impervious. The solution to this complex problem as disclosed here adopts a relatively strong yet flexible fibrous base not impervious to the actuating fluid, but made so by a flexible foil layer positioned adjacent the fibrous base. The foil, of a metal selected for its resistance to the fluid involved, although possibly drawn thin enough to be highly flexible, retains the quality of impermeability as supported by the relatively tougher fibrous layer. Reference to the accompanying figures of the drawing will make this combined structure clear.

Referring now to Figure 1, the complete diaphragm unit 10 supporting transmission rod 12 is shown in perspective. Attached to transmission rod 12 are centrally disposed disc members 14 and 16 above and below the layered diaphragm. Such an arrangement supports the diaphragm from the center toward the periphery leaving a flexible ring of diaphragm material 18 as shown in the drawing. This unsupported portion 18 of the diaphragm extending between the periphery of the discs 14 and 16 and the molded peripheral trough portion 20 distributes the flexing operation over the diaphragm between the supporting discs 14 and 16 and the peripheral support 22. Considered in conjunction with the flexure response of the peripheral trough 20, this ring of diaphragm 18 exposed as described can be increased or decreased, dimensionally, to obtain desired flexing results. Fastened to the periphery of the diaphragm, in this instance on the upper surface, and gripped by peripheral support 22, spaced tines 26 which extend radially inwardly at regular intervals across the molded peripheral trough 20 are curved to contain this portion of the diaphragm arched in the operating direction. Tines 26 terminate at the juncture where the molded trough portion 20 meets the flexible ring 18 of the diaphragm. Circumferentially disposed on the molded peripheral trough portion 20 are several rings 30 and 32 preferably flat in section and of graduated diameter which reinforce the flexing molded portion 20. These reinforcing rings (enlarged in section in Figure 4), adhesively or physically attached as with rivets, are preferably of metal selected to resist operating conditions. Stainless steel would be a proper selection for general use, but other metals, alloys or even other materials can be used if desirable. As shown in Figure 1 and in section in Figures 2 and 4, the rings 30 and 32 on the upper surface abut the retaining curvature of the tines 26. Figures 2 and 4 further show opposed rings 34 and 36 cemented or otherwise affixed to the bottom surface of molded area 20. It will be evident that these rings 30, 32, 34 and 36 may be increased in number, omitted entirely, or used in varying arrangement on one or both, or neither surface as required by the flexibility and durability sought under different conditions of temperature and pressure. For extreme conditions at least two rings in opposition as shown are recommended.

All the figures referred to above, taken together with Figure 3, will clarify the layered construction of the diaphragm with which the tine supports 26 and rings 30, 32, 34 and 36 have been described. A fibrous layer 38 of permeable material which is comparatively tough yet flexible as, for example, glass cloth or the like, forms the basic element of the diaphragm. Such a category of material, although permeable, has the other qualities of strength, flexibility and resistance to high temperatures to a satisfactory degree. On one or both faces with the glass cloth layer 38 a metal foil 40 of satisfactory thickness and flexibility forms an impermeable membrane of tenacity and flexing qualities which combines with the strength of the glass cloth to form an impermeable, highly sensitive and strong diaphragm. This foil layer 40 must be made of material such as a metal having a melting point higher than that to which it would be subjected in use and having stability to oxidation or corrosion. Two such materials are aluminum and tungsten. Other pure metals and alloys may be used as required if they meet the requirements listed above.

To those versed in the art, the operation of the disclosed diaphragm under conditions of normal use for such elements will be clear without further discussion. At rest, the diaphragm will be urged into contact with the tines as shown in Figure 2, by the device to which it is attached functioning through rod 12 and discs 14 and 16. Operating pressure, exerted on the diaphragm and the centrally disposed discs 14 and 16, flexes the unsupported portion 18 and the molded peripheral trough portion 20, urging the transmission rod 12 downwardly in response thereto. On release of the operating pressure the diaphragm flexes upwardly, the molded peripheral portion reengaging the tines. As constructed with the flat ring supports or reinforcing elements, this upward movement is stopped at the tine contour, permitting the flexible ring portion 18 to return to normal position without damage to the foil cover which extends completely across the diaphragm between the central support discs to be held by the peripheral flange supports as shown.

The invention claimed is:

1. A diaphragm comprising a fibrous center layer of substantial strength and flexibility and outer layers of impermeable and temperature resistant metal of flexing thickness, said layers molded with a dished portion around the peripheral flexing edge in both the fibrous and metal layers; and supports for the dished portion including equi-spaced tines curved to follow the surface of the molded, dished portion and extending radially inward from the periphery of the diaphragm, and reinforcing rings circumferentially spaced in the dished portion of the diaphragm to engage the tines extending across this portion.

2. In combination, a diaphragm secured by clamping members at its peripheral portion, a pair of opposed disc members operably engaging the central portion of said diaphragm, said diaphragm comprising a permeable layer of fibrous material and an outer impermeable layer of metallic foil that strengthens and protects the permeable layer from temperature and pressure effects, said layers being molded to form an annular trough adjacent the clamped peripheral portion of the diaphragm; and a pair of spaced circumferentially-extending flat rings fastened to the trough of the diaphragm to reinforce such diaphragm in the area of flexural bending.

3. In combination, a diaphragm secured by clamping members at its peripheral portion, a pair of opposed disc members operably engaging the central portion of said diaphragm, said diaphragm comprising a permeable layer of fibrous material and an outer impermeable layer of metallic foil that strengths and protects the permeable layer from temperature and pressure effects, said layers being molded to form an annular trough adjacent the clamped peripheral portion of the diaphragm; a circumferentially-extending reinforcing member engaging the outer surface of said diaphragm in the region of said trough, and a plurality of circumferentially-spaced tines extending radially across said trough, to thereby limit the diaphragm movement in one direction.

4. In combination, a diaphragm secured by clamping members at its peripheral portion, a pair of opposed disc members operably engaging the central portion of said diaphragm, said diaphragm comprising a permeable layer of fibrous material and an outer impermeable layer of metallic foil that strengths and protects the permeable layer from temperature and pressure effects; a circumferentially-extending reinforcing member engaging the outer surface of said diaphragm in an area between said clamping members and said disc members, and a plurality of circumferentially-spaced, radially-extending members mounted in retaining position with respect to the diaphragm, in an area between said clamping members and said disc members.

References Cited in the file of this patent

UNITED STATES PATENTS

| 146,661 | Palos | Jan. 20, 1874 |
| 1,885,851 | McKee | Nov. 1, 1932 |
| 2,226,589 | Smyers | Dec. 31, 1940 |
| 2,638,930 | Barr | May 19, 1953 |